(12) United States Patent
Faizanullah et al.

(10) Patent No.: US 9,729,671 B2
(45) Date of Patent: Aug. 8, 2017

(54) SYSTEMS AND PROCESSES FOR COMPUTER LOG ANALYSIS

(71) Applicant: YScope Inc., Toronto (CA)

(72) Inventors: Muhammad Faizanullah, Redmond, WA (US); David Lion, Toronto (CA); Yu Luo, Toronto (CA); Michael Stumm, Toronto (CA); Ding Yuan, Toronto (CA); Xu Zhao, Toronto (CA); Yongle Zhang, Toronto (CA)

(73) Assignee: YScope Inc., Toronto (CA)

( * ) Notice: Subject to any disclaimer, the term of this patent is extended or adjusted under 35 U.S.C. 154(b) by 10 days.

(21) Appl. No.: 14/875,103

(22) Filed: Oct. 5, 2015

(65) Prior Publication Data

US 2016/0098342 A1 Apr. 7, 2016

Related U.S. Application Data

(60) Provisional application No. 62/059,954, filed on Oct. 5, 2014.

(51) Int. Cl.
*G06F 9/44* (2006.01)
*H04L 29/08* (2006.01)
(Continued)

(52) U.S. Cl.
CPC .............. *H04L 67/34* (2013.01); *G06F 8/443* (2013.01); *G06F 11/3447* (2013.01);
(Continued)

(58) Field of Classification Search
CPC .. G06F 11/3612; G06F 11/3608; G06F 8/443; G06F 11/3466
(Continued)

(56) References Cited

U.S. PATENT DOCUMENTS 5,297,274 A * 3/1994 Jackson ............... G06F 11/3466
703/22
5,313,616 A * 5/1994 Cline .................. G06F 11/3612
713/323
(Continued)

OTHER PUBLICATIONS

Zhenyu Guo et al., "G² : A Graph Processing System for Disgnosing Distributed Systems", Jun. 15, 2011, pp. 1-14, USENIX Publisher, Published in Portland, or for the Proceedings of the 2011 USENIX Annual Technical Conference (USENIX ATC '11).
(Continued)

*Primary Examiner* — Phillip H Nguyen
(74) *Attorney, Agent, or Firm* — Perry + Currier Inc.

(57) ABSTRACT

Existing program code, which is executable on one or more computers forming part of a distributed computer system, is analyzed. The analysis identifies log output instructions present in the program code. Log output instructions are those statements or other code that generate log messages related to service requests processed by the program code. A log model is generated using the analysis. The log model is representative of causal relationships among service requests defined by the program code. The log model can then be applied to logs containing log messages generated by execution of the program code, during its normal operation, to group log messages for improved analysis, including visualization, of the performance and behavior of the distributed computer system.

16 Claims, 11 Drawing Sheets

(51) Int. Cl.
*G06F 11/36* (2006.01)
*G06F 11/34* (2006.01)
*G06F 9/45* (2006.01)
*G06F 11/32* (2006.01)

(52) U.S. Cl.
CPC ...... *G06F 11/3466* (2013.01); *G06F 11/3476* (2013.01); *G06F 11/3608* (2013.01); *G06F 11/3612* (2013.01); *G06F 11/323* (2013.01)

(58) Field of Classification Search
USPC .................................................. 717/131, 141
See application file for complete search history.

(56) References Cited

U.S. PATENT DOCUMENTS

| | | | | |
|---|---|---|---|---|
| 5,794,044 | A * | 8/1998 | Yellin | G06F 9/468 712/E9.084 |
| 6,279,002 | B1 * | 8/2001 | Lenz | G06F 11/3466 |
| 6,557,167 | B1 * | 4/2003 | Thelen | G06F 11/323 714/E11.181 |
| 7,293,259 | B1 * | 11/2007 | Dmitriev | G06F 11/3466 714/E11.207 |
| 7,743,414 | B2 * | 6/2010 | Pouliot | G06F 21/552 709/224 |
| 8,079,081 | B1 * | 12/2011 | Lavrik | H04L 41/069 709/223 |
| 8,561,025 | B1 * | 10/2013 | Bisht | G06F 11/362 717/124 |
| 8,578,393 | B1 * | 11/2013 | Fisher | G06F 11/3476 709/200 |
| 2002/0129329 | A1 * | 9/2002 | Nishioka | G06F 11/3476 717/104 |
| 2003/0131282 | A1 * | 7/2003 | Lowen | G06F 11/0715 714/20 |
| 2004/0153878 | A1 * | 8/2004 | Bromwich | G06F 11/3636 714/48 |
| 2009/0006071 | A1 * | 1/2009 | Dournov | G06F 11/3457 703/22 |
| 2013/0073526 | A1 * | 3/2013 | Deluca | G06F 17/3015 707/692 |

OTHER PUBLICATIONS

Benjamin H. Sigelman et al., "Dapper, A Large-Scale Distributed Systems Tracing Infrastructure", Google Technical Report, Apr. 27, 2010, pp. 1-14, Google Inc., USA.

Wei Xu et al., "Detecting Large-Scale System Problems by Mining Console Logs", In proceedings of the ACM SIGOPS 22nd Symposium on Operating Systems Principles, SOSP, Oct. 11, 2009, pp. 117-132, Association for Computing Machinery (ACM), New York, NY, USA.

Mark K. Aguilera et al., "Performance Debugging for Distributed Systems of Black Boxes", SOSP '03 Proceedings of the nineteenth ACM symposium on Operating systems principles, Oct. 19, 2003, pp. 14-89, Association for Computing Machinery (ACM), New York, NY, USA.

Mike Y. Chen et al. "Pinpoint: Problem Determination in Large, Dynamic Internet Services", DSN 02 Proceedings of the 2002 International Conference on Dependable Systems and Networks, Jun. 23, 2002, pp. 595-604, IEEE Computer Society, Washington, DC, USA.

Ding Yuan et al., "Sherlog: Error Disgnosis by Connecting Clues From Run-Time Logs", Proceedings of the 15th International Conference on Architectural Support for Programming Languages and Operating Systems, Mar. 2010, pp. 143-154, ACM, Pittsburgh, Pennsylvania, USA.

Karthik Nagaraj et al., "Structured Comparative Analysis of Systems Logs to Diagnose Performance Problems", Proceedings of the 9th USENIX conference on Networked Systems Design and Implementation , Apr. 4, 2012, p. 26, USENIX Association, Berkeley, CA, USA.

Paul Barham et al., "Using Magpie for Request Extraction and Workload Modelling", Proceedings of the 6th conference on Symposium on Operating Systems Design & Implementation—vol. 6, Dec. 6, 2004, p. 18, USENIX Association, Berkeley, CA, USA.

Rodrigo Fonseca, "X-Trace: A Pervasive Network Tracing Framework", Proceedings of the 4th USENIX conference on Networked systems design & implementation, Apr. 11, 2007, USENIX Association, Berkeley, CA, USA.

* cited by examiner

```
1 HDFS_READ, blockId: BP-9..9:blk_5..7_1032 ──── read
2 Receiving block BP-9..9:blk_5..7_1032
3 Received block BP-9..9:blk_5..7_1032 ────→ write 1
4 Receiving block BP-9..9:blk_4..8_2313 ────→ write 2
5 PacketResponder: BP-9..9:blk_5..7_1032 terminating
6 opWriteBlock BP-9..9:blk_4..8_2314 received exception
```

FIG. 4

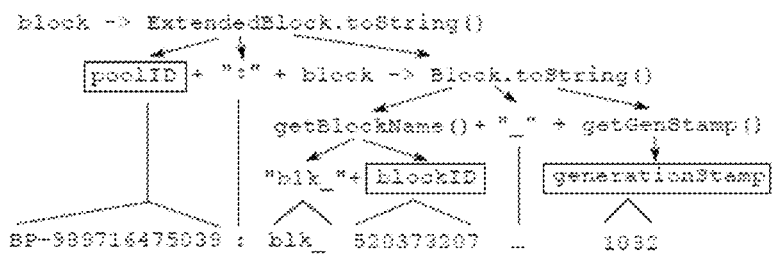

FIG. 5

```
1  class DataXceiver implements Runnable {
2    public void run() {
3      do { //handle one request per iteration
4        switch (readOpCode()) {
5        case WRITE_BLOCK: // a write request
7          writeBlock(proto.getBlock(), ..); break;
8        case READ_BLOCK: // a read request
9          readBlock(proto.getBlock(), ..); break;
10       } //proto.getBlock: deserialize the request
11     } while (!socket.isClosed());
12   }
13   void writeBlock(ExtendedBlock block..) {
14     LOG.info("Receiving block " + block);
15     sender.writeBlock(block,..); //send to next DN
16     responder = new PacketResponder(block,..);
17     responder.start(); // create a thread that
18   }                    // handles the acks
19 }
20 /* PacketResponder handles the ack responses */
21 class PacketResponder implements Runnable {
22   public void run() {
23     ack.readField(downstream); //read ack
24     LOG.info("Received block " + block);
25     replyAck(upstream); //send an ack to upstream
26     LOG.info(myString + " terminating");
27   }
28 }
```

FIG. 6

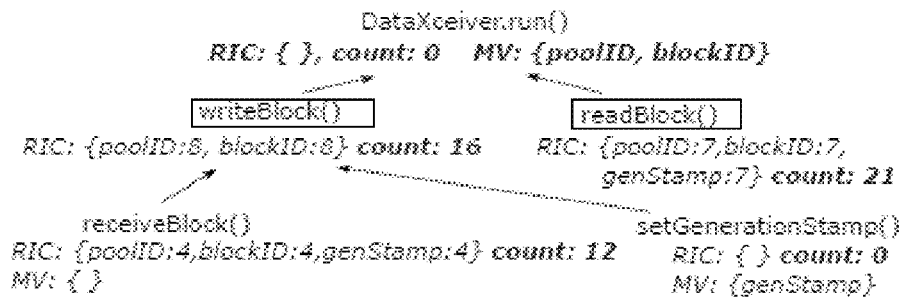
FIG. 7
```
LOG.info("Request starts"); // log1    entry
while (not_finished){                    ↓
   r.process(); // log2 and log 3       log 1
}                                         ↘ log 2,3 *
LOG.info("Request ends"); // log4      log 4
                                         ↓
                                        exit
```
FIG. 8
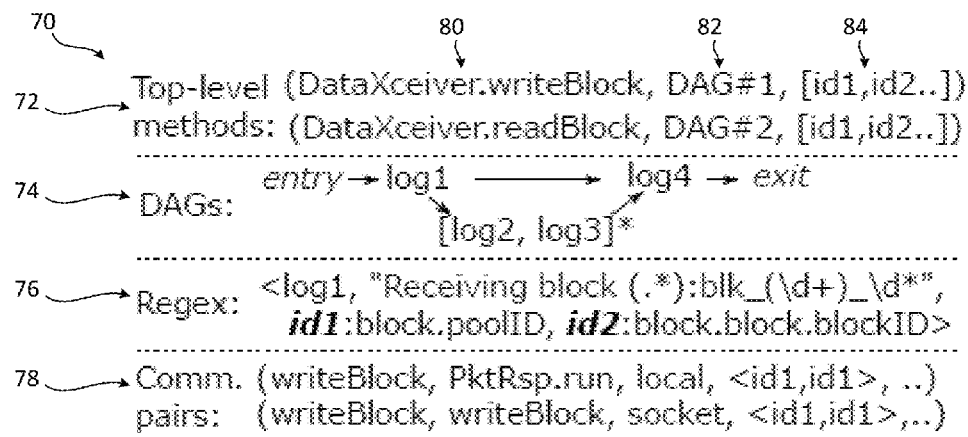
FIG. 9

| Request type | start timestamp | end timestamp | nodes traversed IP | start time. | end time. | log sequence ID |
|---|---|---|---|---|---|---|
| writeBlock | 2014-04-21 05:32:45,103 | 2014-04-21 05:32:47,826 | 172.31.9.26 172.31.9.38 172.31.9.12 | 05:32:45,103 05:32:45,847 05:32:46,680 | 05:32:47,826 05:32:47,567 05:32:47,130 | 41 |

| System | LOC | workload | # of msg. |
|---|---|---|---|
| HDFS-2.0.2 | 142K | HiBench | 1,760,926 |
| Yarn-2.0.2 | 101K | HiBench | 79,840,856 |
| Cassandra-2.1.0 | 210K | YCSB | 394,492 |
| HBase-0.94.18 | 302K | YCSB | 695,006 |

FIG. 16

| System | Threads | | Top-lev. meth. | Log points | |
|---|---|---|---|---|---|
| | tot. | $\geq$ 1 log* | | $\geq$ 1 id. | per DAG* |
| HDFS | 44 | 95% | 167 | 79% | 8 |
| Yarn | 45 | 73% | 79 | 66% | 21 |
| Cass. | 92 | 74% | 74 | 45% | 21 |
| HBase | 85 | 80% | 193 | 74% | 30 |
| Average | 67 | 81% | 129 | 66% | 20 |

FIG. 17

| System | Correct | Incomplete | Incorrect | Failed |
|---|---|---|---|---|
| HDFS | 97.0% | 0.1% | 0.3% | 2.6% |
| Yarn | 79.6% | 19.2% | 0.0% | 1.2% |
| Cassandra | 85.7% | 9.6% | 0.3% | 4.4% |
| HBase | 90.6% | 2.5% | 3.5% | 3.4% |
| Average | 88.2% | 7.9% | 1.0% | 2.9% |

FIG. 18

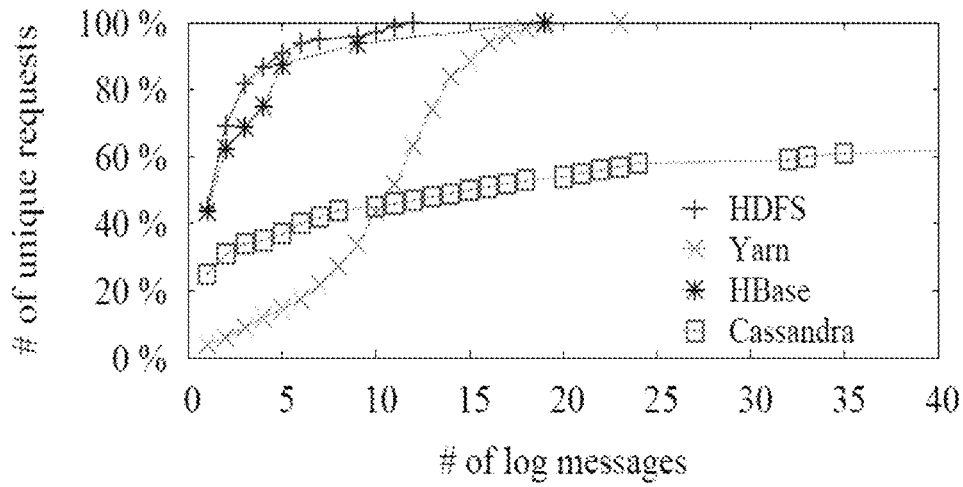

FIG. 19

| Category | example | tot. | helpful |
|---|---|---|---|
| Unnecessary operation | Redundant DNS lookups (should have been cached) | 15 | 13 (87%) |
| Synchronization | Block scanner holding lock for too long, causing other threads to hang | 4 | 1 (25%) |
| Unoptimized operation | Used a slow read method | 2 | 0 (0%) |
| Unbalanced workload | A particular region server serves too many requests | 1 | 1 (100%) |
| Resource leak | Secondary namenode leaks file descriptor | 1 | 0 (0%) |
| Total | - | 23 | 15 (65%) |

FIG. 20

| Analysis | helpful |
|---|---|
| Request clustering to identify bottleneck | 73% |
| Log printing methods (inefficiencies are in the same method as the log point) | 67% |
| Request latency analysis | 33% |
| Per-node request count | 7% |

| System | Time (s) | | Memory (MB) | |
|---|---|---|---|---|
| | map+comb. | reduce | map+comb. | reduce |
| HDFS | 14/528 | 21 | 185/348 | 1,901 |
| Yarn | 412/843 | 1131 | 1,802/3,264 | 7,195 |
| Cassandra | 4/9 | 17 | 90/134 | 833 |
| HBase | 3/7 | 2 | 74/150 | 242 | ically, to logging service requests in computer sys-
SYSTEMS AND PROCESSES FOR COMPUTER LOG ANALYSIS

CROSS-REFERENCE TO RELATED APPLICATIONS

This application claim priority to U.S. Provisional Patent Application 62/059,954, filed on Oct. 5, 2014, which is incorporated herein by reference.

FIELD

This disclosure relates to computer systems and, more specifically, to logging service requests in computer systems.

BACKGROUND

Computer systems are in an ever growing trend of becoming more powerful and intelligent. With the increase of Internet connectivity, software vendors today are aggregating computing resources to provide extremely powerful software services over the Internet—known as the "cloud-computing" model. The underlying software systems that power these internet services are distributed—they run on a large number of networked computer servers that communicate and coordinate. For example, it is reported that Google uses hundreds of thousands of networked machines to provide its internet services including search, Gmail, Google Doc, etc., and that Facebook also uses a similar number of machines to power its online social networking site.

These distributed software systems are extremely complex. For example, when a user accesses the internet service, a web server will first receive the request, and it may forward it to an application server which provides the actual service. The application server may further communicate with multiple storage servers on which the user data is located. Such setting can be commonly found in cloud vendors including Google, Facebook, etc., only that in practice there are many more types and quantities of servers (e.g., database servers, memory caches, etc.).

Because of the complexity, it is also extremely challenging to understand and analyze the behavior and performance of such systems. For example, if a user experiences slow responding time, finding the culprit in the hundreds of thousands of servers is like finding a needle in the haystack.

Problems in known systems include performance monitoring and trouble-shooting, failure recovery, and optimization.

Regarding performance monitoring and trouble-shooting, the performance of software services, e.g., user response time, has significant business impact. For example, Amazon.com has found that every 100 ms latency cost them 1% in sales, and Google has found an extra 0.5 seconds in search page generation time dropped traffic by 20%. Therefore it is important for software vendors to have tools to monitor performance, and analyze the root cause if performance is slow.

Regarding failure recovery, production software systems experience failures. For example, Google's Gmail experienced a 2-day outage in 2011, affecting hundreds of thousands of users, and Amazon's EC2 service had an outage for over 4 days in 2011. Once a failure occurs, it is important for a vendor to understand system behavior and to infer the root cause in order to recover from the failure.

Regarding optimization, software companies today spend billions of dollars on infrastructure. For example, Google spent 2.35 billion dollars on infrastructures in the first quarter of 2014 alone. Understanding the behaviors of these systems can reveal opportunities to optimize their resource usage, which can have a significant financial impact.

BRIEF DESCRIPTION OF THE DRAWINGS

The drawings illustrate, by way of example only, embodiments of the present disclosure.

FIG. 4 is an extract from an example Hadoop Distributed File System (HDFS) log.

FIG. 5 is a diagram of logic underlying example log message output.

FIG. 6 is a program code listing for an example class that processes an HDFS write request.

FIG. 7 is a diagram showing an example request identifier analysis for the program code listing of FIG. 6.

FIG. 8 is a diagram of a Directed Acyclic Graph (DAG) representation of log points.

FIG. 9 is a diagram showing an example log model file.

FIGS. 16-18, 20, 21, and 23 are tables of test results.

FIGS. 19 and 22 are graphs of test results.

DETAILED DESCRIPTION

This disclosure provides techniques, such as systems and processes which may be termed profiling tools, for analyzing behavior and performance of distributed computer systems to mitigate or solve at least some of the problems discussed above.

The present invention provides for non-intrusive profiling aimed at analyzing and debugging the performance of distributed computer systems. Instrumentation and modifications to source code are not required. Rather, the techniques discussed herein extract information related to log message output due to the course of normal system operation. Further, the disclosed techniques are capable of automatically identifying service requests from logs and are capable of profiling the performance behavior of such requests. Specifically, the systems and processes discussed herein are capable of reconstructing how each service request is processed as it invokes methods, uses helper threads, and invokes remote services on other computers (nodes) of the system. The techniques are practical to implement, and are capable of diagnosing performance issues that existing solutions are not able to resolve without instrumentation.

Figure 1:
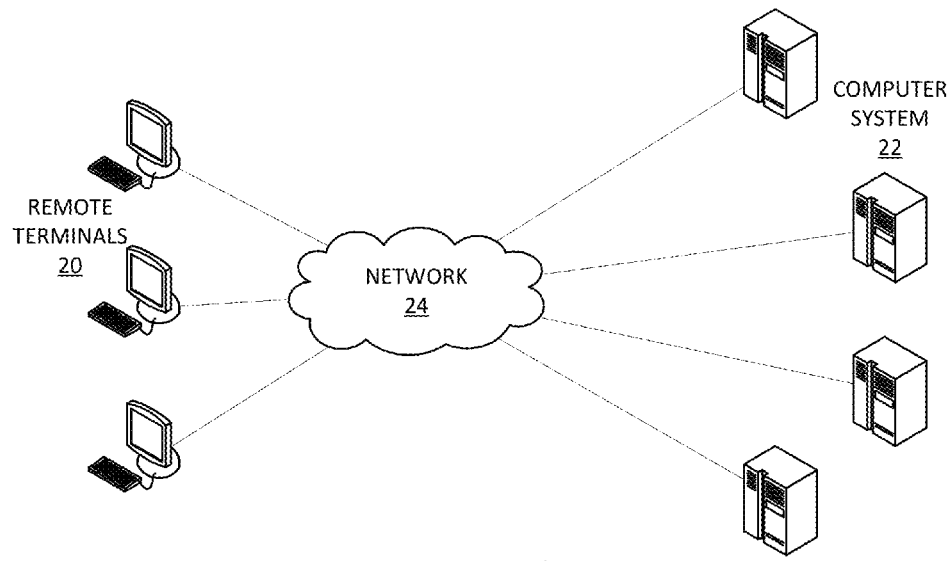
FIG. 1 is a diagram of a networked computer system.

FIG. 1 shows a networked computer system for use with the techniques discussed herein. A plurality of remote terminals 20 interact with a distributed computer system 22 via a network 24. The remote terminals 20 are devices such as desktop and laptop computers, smartphones, tablet computers, and the like. The network 24 includes one or a combination of computer networks, such as a local-area network, a wide-area network, an intranet, a virtual private network, and the Internet. The distributed computer system 22 includes a plurality of computers acting as different nodes and mutually communicating via the network 24. The computers making up the distributed computer system 22 may be located across a large geographic area. The computers may be termed servers and may be configured with program code for different functionality to serve an overall purpose, such as data storage, a messaging service (e.g., email), a social network, a voice or teleconference service, a videoconference service, image storage, and similar.

One or more of the computers in the distributed computer system 22 is configured to receive service requests from one or more other computers of the system 22 and/or the remote terminals 20. Such service requests may include request for data or other elements fitting the overall purpose of the distributed computer system 22. One or more of the computers in the distributed computer system 22 is configured to log service requests and data related thereto. A log stores log messages that specify any information or data determined to be relevant to the operation of the computer system 22. A log may be stored on the computer generating the log messages or log messages may be transmitted to another computer for storage. The number and types of computers storing logs is not limited. In one example, one or several computers have program code configured to output log messages. In another example, most or all of the computers output log messages.

Figure 2:
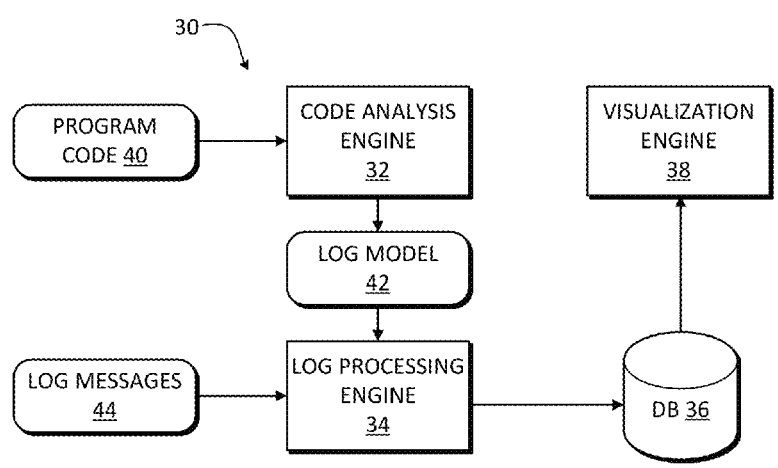
FIG. 2 is a diagram of a log processing system according to the present invention.

An analysis is performed on program code of the distributed computer system 22 to obtain a log model for use in interpreting and stitching together dispersed and intertwined log messages of individual requests. It is not necessary to analyze all of the program code of the distributed computer system 22, but generally the more code analyzed, the better the results. FIG. 2 shows a log processing system 30 configured to perform such analysis, which may be termed a static analysis, in that the analysis need only be performed once for a given version of program code.

With reference to FIG. 2, the log processing system 30 includes a program code analysis engine 32, a log processing engine 34, a results database 36, and a visualization engine 38. The log processing system 30 is configured to be executed by one or more computers, which can include one or more computers of the distributed computer system 22 and/or other computers.

The program code analysis engine 32 operates on existing program code 40 that is executable by the distributed computer system 22 to provide functionality to the system 22. The program code analysis engine 32 processes the program code 40 to obtain a log model 42 that describes interrelations among log messages that can be generated by the program code 40 during normal operation of the program code 40. The generation, timing, and content of the log messages is outside the control of the log processing system 30. In addition, the program code 40 is not modified by the log processing system 30.

The program code analysis engine 32 is configured to perform an analysis on the existing program code 40. The analysis is configured to identify log output instructions present in the program code 40. The log output instructions are instructions configured to generate log messages 44 related to service requests processed by the program code 40.

The program code analysis engine 32 is further configured to use the analysis to generate the log model 42. As will be discussed in more detail below, the log model 42 is representative of causal relationships among service requests defined by the program code 40. The log model 42 can be transmitted from a computer executing the program code analysis engine 32 to one or more relevant computers (nodes) of the distributed computer system 22, such as computers that generate logs.

In the examples discussed herein, the program code 40 includes bytecode, such as that used in Java. This is not limiting, and the program code 40 can alternatively or additionally include source code, binary code (e.g., x86 binaries), intermediate code (e.g., Low Level Virtual Machine or LLVM code), and the like.

The program code analysis engine 32 is configured to analyze each log printing (outputting) statement in the program code 40 to determine how to parse log messages and to identify variable values that are outputted by the log messages. Log outputting statements include file writing statements and the like. The term statement is used herein to refer to log output instructions. For purposes of this disclosure, the terms statement and instruction are interchangeable and any differences there-between in practical application are recognized by those of skill in the art. For example, statements may be known to refer to source code, while instructions may be known to refer to compiled code. However, this distinction is not relevant to the present invention. The term variable is used inclusively and may be taken to mean a variable, a field, or other element of data. To achieve this, the program code analysis engine 32 is configured to extract identifiers whose values remain unchanged in each specific request by further analyzing the data-flow of these variable values. Such identifiers can help associate log messages to individual requests. Further, the program code analysis engine 32 is configured to capture temporal orderings between log printing statements because, in various systems, an identifier may not exist in log messages or may not be unique to a particular service request. The program code analysis engine 32 is further configured to identify control paths across different local and remote threads by inferring their communication relationships. Each of these techniques will be discussed in detail below. In addition, although the examples discussed herein may be described as using all of these techniques, each technique can be implemented alone or in combination with any of the other techniques.

The log processing engine 34 can be executed by a computer, such as one or more logging computers (nodes), of the distributed computer system 22 or by another computer.

The log processing engine 34 is configured to apply the log model 42 to a plurality of log messages 44 generated by execution of the program code 40 at the distributed computer system 22, so as to assign log messages 44 to accumulated groups for easier and more robust analysis of the system's response to service requests. The log processing engine 34 can be executed by a computer, such as one or more logging computers (nodes), of the distributed computer system 22 or by another computer.

The log processing engine 34 can be implemented as a MapReduce job or by another parallel analysis framework or technique for processing and generating large data sets with a parallel, distributed algorithm on a cluster of computers. MapReduce is a known programming model and "MapReduce: Simplified data processing on large clusters" by J. Dean and S. Ghemawat can be referenced. The log processing engine 34 processes log files of each relevant computer of the distributed computer system 22 in parallel using a map function to infer causal relationships among log messages. The log processing engine 34 is further configured to merge log sequences from locally communicating threads of the same process, before shuffling an intermediate result to reduce nodes that perform a reduce function. The log processing engine 34 then stores such per-request performance information in the results database 36. These processes will be discussed in more detail below.

The visualization engine 38 is configured to provide a graphical user interface to visualize the log analysis results contained in the results database 36. Users, via remote admin terminals or other computers, can connect to the visualization engine 38 to graphically examine the behavior of the distributed computer system 22, such as latency of requests, latency on each node, etc. These processes will be discussed in more detail below.

Figure 3:
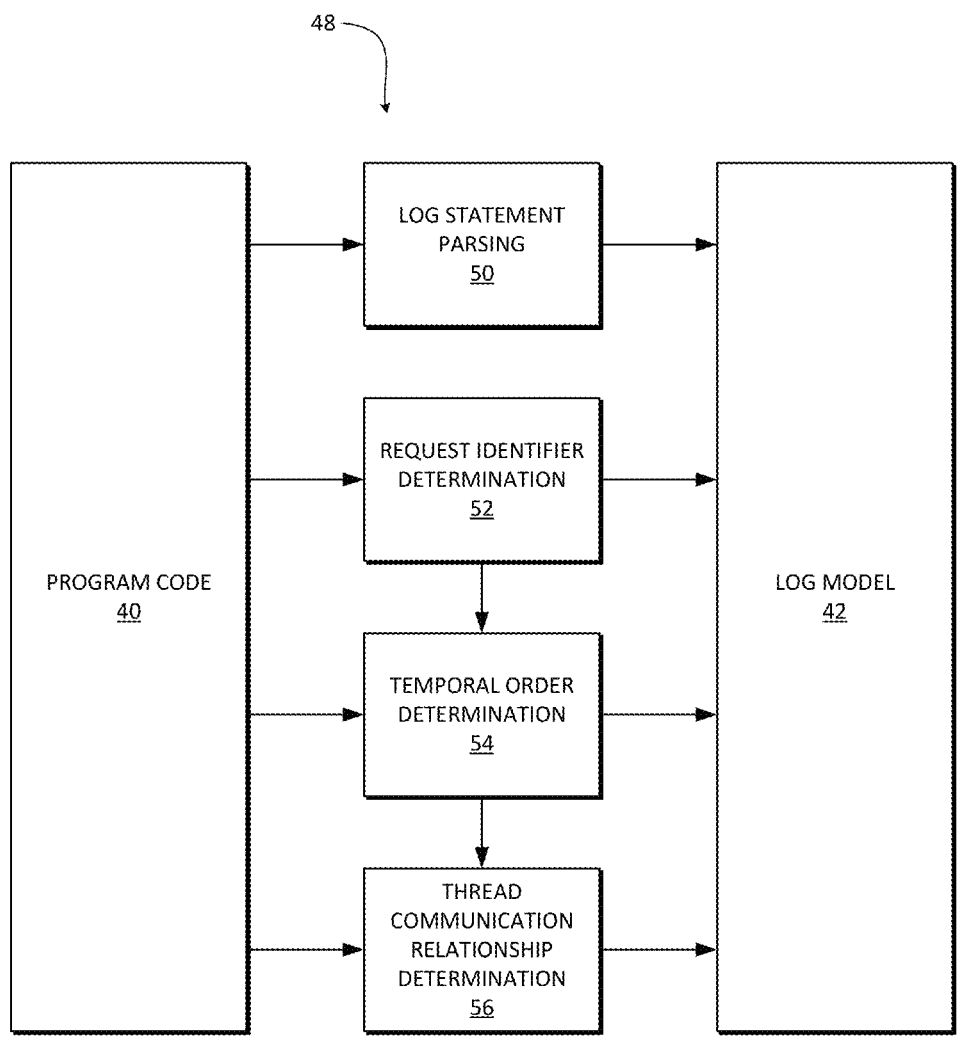
FIG. 3 is a diagram showing a process for generating a log model.

FIG. 3 shows a program code analysis process 48 for analyzing program code 40 and generating the log model 42. The process 48 can be implemented at the program code analysis engine 32. The process 48 includes log-statement parsing 50, request identifier determination 52, temporal order determination 54, and thread communication relationship determination 56. Each of the sub-processes 50-56 can be performed in parallel on the same program code 40 in one pass, taking into account that some output from request identifier determination 52 can be used as input to the temporal order determination 54 and the thread communication relationship determination 56 and that some output from the temporal order determination 54 can be used as input to the thread communication relationship determination 56.

Log-statement parsing 50 includes identifying log printing (output) statements in the program code 40 and parsing a log-string format and variables to obtain a signature of each log printing statement found in the program code 40. Log-statement parsing 50 includes generating an output string that is composed of string constants and variable values. The output string is represented by a regular expression (e.g., "Receiving block BP-(.*):blk_(.*)_.*"), which is used during log analysis by the log processing engine 34 to map a log message to a set of log points in the program code 40 that could have outputted such a log message. A log point refers to a log printing (output) statement in the program code 40 and may include a log file write command or similar. In the examples discussed herein, log points are identified by invocations of a method (e.g., "info") of a class named "LOG". Log-statement parsing 50 also includes identifying the variables whose values are contained in a log message.

Log-statement parsing 50 identifies log points in the program code 40. For each log point, a regular expression is generated. The regular expression matches the outputted log message. Log-statement parsing 50 also identifies the variables whose values appear in the log output. Log-statement parsing 50 is configured to parse out individual fields by recursively tracing an object's string output method (e.g., toString( ) in Java) and the methods that manipulate related objects (e.g., StringBuilder objects in Java) until an object of a primitive type is reached.

FIG. 6 shows example program code 40 is processed by the program code analysis process 48 to generate the log model 42. An example log statement, at line 14 in FIG. 6, can be parsed into the regular expression "Receiving block (.*)", where the wildcard ".*" matches to the value of "block", which is the identifier of the object that contains variable information to be logged. Concerning variables, individual fields are parsed, which handles the example situation where "poolID" and "blockID" can be taken as request identifiers, whereas "generationStamp" is modified during request processing and cannot be considered a request identifier.

For the example log point mentioned above (line 14), a signature generated by log-statement parsing 50 in the form of a regular expression is:

Receiving block (.*):blk_(\d+)_(\d+)

The three wildcard components (i.e., ".*" and "\d") will be mapped to fields "block.poolID", "block.block.blockID", and "block.block.generationStamp" of the block object, respectively, as shown in FIG. 5.

Log-statement parsing 50 is also configured to analyze dataflow of any string object used at a log point. For example, the string "myString" at the log point of line 26 in the example code of FIG. 6 is a string object initialized earlier in the code. Log-statement parsing 50 analyzes the dataflow of the string object to identify the precise value of "myString".

Log-statement parsing 50 is also configured to account for class inheritance and late binding, which are features of many programming languages such as Java. For example, when a class and its superclass both provide the same method (e.g., a toString( ) method), the particular method that gets invoked during execution is resolved only at runtime depending on the actual type of the object. Log-statement parsing 50 is configured to analyze the methods of both classes and generate two regular expressions for the one log point. During log analysis, if both regular expressions match a log message, the log processing engine 34 is configured to use the one log message with the more precise match, i.e., the regular expression with a longer constant pattern.

Request identifier determination 52 includes analyzing dataflow of the variables to determine which variables are modified. Variables determined to be not modified are considered to be request identifiers. Request identifiers are used to separate messages from different requests. That is, two log messages with different request identifiers (i.e., different variables or sets of variables that are not modified) are considered to belong to different requests. However, the converse is not true: two messages with the same request identifier value may belong to different requests. Request identifier determination 52 includes identifying top-level methods.

Request identifier determination 52 analyzes one method at a time and stores the result as the summary of that method. The methods are analyzed in bottom-up order along the call-graph and when a call instruction is encountered, the summary of the target method is used. This alleviates the need to store an intermediate representation of the entire program in memory.

Request identifier determination 52 uses dataflow analysis to infer request identifiers by analyzing inter-procedural dataflow of any logged variables. For each method M, two sets of variables are assembled in a summary, namely, (i) the request identifier candidate (RIC) set, which contains variables whose values are output to a log and not modified by the method M or its callees, and (ii) the modified variable (MV) set which contains variables whose values are modified. For each method M, the sub-process initializes both sets to be empty. The sub-process then analyzes each instruction in method M. When a log point is encountered, the variables whose values are printed (as identified previously) are added to the RIC set. If an instruction modifies a variable v, the variable v is added to the MV set and removed from the RIC set. If the instruction is a call instruction, the process merges the RIC and MV sets of the target method into the corresponding sets of the current method, and then, for each variable v in the MV set, the process removes the instruction from the RIC set if it contains the variable v.

As an example, consider the following code snippet from the example writeBlock( ) method:

LOG.info("Receiving"+block);

block.setGenerationStamp(latest);

The setGenerationStamp( ) method modifies the "generationStamp" field in the "block" class. In bottom-up order, the request identifier determination 52 first analyzes the setGenerationStamp( ) method and adds "generationStamp" to its MV set. Later, when request identifier determination 52 analyzes the writeBlock( ) method, it removes "generationStamp" from its RIC set because "generationStamp" is in the MV set of the setGenerationStamp( ) method.

With reference to an example Hadoop Distributed File System (HDFS) log extract, shown in FIG. 4, request identifiers are shown in bold (e.g., "BP-9 . . . 9:blk_5 . . . 7_1032"). In this example, both of the "read" and the "write 1" requests have same the block ID ("1032"). Note that timestamps of the log messages are omitted for sake of clarity.

FIG. 5 shows logic underlying output of example log message containing the string "BP-9 . . . 9:blk_5 . . . 7_1032" shown in FIG. 4. This string might be considered a potential request identifier. This string contains the values of three variables, as shown in FIG. 5, namely, "poolID", "blockID", and "generationStamp". Only the substring containing "poolID" and "blockID" is suitable as a request identifier for an example writeBlock( ) method, shown in FIG. 6, because the "generationStamp" variable can have different values while processing the same request, as exemplified by the "write 2" request in FIG. 4.

Request identifier determination 52 infers which log points belong to the processing of the same request. Top-level methods are identified by analyzing when identifiers are modified. The term top-level method refers to the first method of any thread dedicated to the processing of a single type of request. For example, in FIG. 6, the writeBlock( ) method and the run( ) method of the "PacketResponder" class are top-level methods. However, the run( ) method of the "DataXceiver" class is not a top-level method because it processes multiple types of request. Generally, a method M is log point p's top-level method if method M is a top-level method and log point p is reachable from M.

Request identifier determination 52 identifies top-level methods by processing each method of a call-graph in bottom-up order. That is, if a method M modifies many variables that have been recognized as request identifiers in its callee method M', then method M' is recognized as a top-level method. It is contemplated that programmers often log request identifiers to help debugging, and the modification of a frequently logged but rarely modified variable is likely not part of the processing of a specific request. Hence, the request identifier determination 52 can be configured to take advantage of this to identify top-level methods.

With reference to the schematic example request identifier analysis shown in FIG. 7, request identifier determination 52 would identify the example readBlock( ) and writeBlock( ) methods as being two top-level methods for different types of requests. Hence, log messages output by the readBlock( ) method would be separated from log messages outputted by the writeBlock( ) method, even if such log messages have the same request identifier value.

In general, top-level methods are identified by tracking the propagation of variables in the RIC set and using the following heuristic when traversing the call-graph in a bottom-up manner: if, when moving from a method M to its caller method M', many request identifier candidates are suddenly removed, then it is likely that method M is a top-level method. Specifically, the number of times each request identifier candidate appears in a log point in each method is counted and this counter is accumulated along the call-graph in a bottom-up manner. Whenever this count decreases from method M to its caller M', it can be determined that method M is a top-level method. This takes advantage of the tendency of developers to often include identifiers in their log printing statements, and modifications to these identifiers are contemplated to be likely outside the top-level method.

With reference to the schematic example request identifier analysis shown in FIG. 7, both the writeBlock( ) method and the readBlock( ) method accumulate a large count of request identifiers, which drops to zero in the run( ) method. Accordingly, request identifier determination 52 determines that the writeBlock( ) and readBlock( ) methods are top-level methods instead of the run( ) method. Note that, although the count of the "generationStamp" variable decreases when the analysis moves from the setGenerationStamp( ) method to the writeBlock( ) method, the determination 52 does not determine that the setGenerationStamp( ) method is a top-level method because the accumulated count of all request identifiers is still increasing from the setGenerationStamp( ) method to the writeBlock( ) method.

When analyzing the writeBlock( ) method, the RIC set obtained from its callee receiveBlock( ) method is merged into its own set, so that the cumulative count of "poolID" and "blockID" is increased to eight. Four of this count comes from the receiveBlock( ) method and the remaining four comes from the log points in the writeBlock( ) method. Since "generationStamp" is in the setGenerationStamp( ) method's MV set, it is removed from the writeBlock( ) method's RIC set.

Request identifier determination 52 stops at the root of the call-graph, which is either a thread entry method (i.e., a run( ) method in Java) or main( ). However, a thread entry method may not be the entry of a service request. With reference to the HDFS example shown in FIG. 6, the "DataXceiver" thread uses a while loop to handle read and write requests. Thus, it is advantageous that the request identifier determination 52 can identify the writeBlock( ) and readBlock( ) methods as the top-level methods, as opposed to the run( ) method.

Temporal order determination 54 creates temporal associations or dissociations among log output statements. Temporal order determination 54 performs a line-by-line analysis of methods to determine the logical expected order of log statements resulting from a request as well as impossible orders of log statements for a request. For instance, with reference to the example of FIG. 6, temporal order determination 54 would determine that when two messages appear in the following order: " . . . terminating" and "Received block . . . ", they cannot be from the same request even if they have the same block identifier because line 26 is executed after line 24. Temporal order determination 54 is advantageous because there may not be an identifier unique to each request.

Temporal order determination 54 is configured to generate a Directed Acyclic Graph (DAG) for each top-level method (as identified by the request identifier determination 52) from the method's call graph and control-flow graph (CFG). This DAG contains each log point reachable from the top-level method and is used to help attribute log messages to top-level methods. Temporal order determination 54 implements several conditions to advantageously avoid having to attempt to infer the precise order in which instructions will execute.

As a first condition, only nodes that contain log printing statements are represented in the DAG. As a second condition, all nodes involved in a strongly connected component (e.g., caused by loops) are folded into one node. Multiple log points may be assigned to a single node in the DAG. In a third condition, if there is a strongly connected component due to recursive calls, then those nodes are also folded into one. Finally, as a fourth condition, unchecked exceptions are ignored, since unchecked exceptions will terminate execution. Checked exceptions are captured by the CFG and are included in the DAG.

As an example, FIG. 8 shows the DAG generated from a code snippet. The asterisk ("*") next to the log points "log 2" and "log 3" indicates that these log points may appear zero or more times. Ordering of the log points is not maintained for nodes with multiple log points. The DAG advantageously captures the starting and ending log points of a request, which is beneficial in that it is a common practice for developers to print a message at the beginning of each request and/or right before the request terminates.

Thread communication relationship determination 56 is configured to identify threads that communicate with each other. Log messages outputted by two threads that communicate may result from processing of the same request, and thread communication relationship determination 56 can be used to associate log statements that generate such log messages. It is contemplated that this kind of thread communication can occur through cooperative threads in the same process, or via sockets or remote procedure calls (RPCs) across a network.

Output of the communication relationship determination 56 includes a tuple for each pair of threads in communication, such as:

(top-level method 1, top-level method 2, communication type, set of request identifier pairs)

where one end of the communication is reachable from top-level method 1 and the other end is reachable from top-level method 2. "Communication type" is selected as one of local, RPC, or socket, where "local" is used when two threads running in the same process communicate. A request identifier pair captures the transfer of request identifier values from the source to the destination. The pair identifies the variables containing the data values at source and destination.

Thread communication relationship determination 56 is configured to detect two types of local thread communications: (i) thread creation and (ii) shared memory reads and writes. Detecting thread creation is readily done in program code that has a well-defined thread creation mechanism, such as Java. If an instruction r.start( ) is reachable from a top-level method, where r is an object of class C that extends the "Thread" class or implements the "Runnable" interface and where C.run( ) is another top-level method, then a communication pair can be determined to be identified. Thread communication relationship determination 56 also determines the dataflow of request identifiers, as they are mostly passed through the constructor of the target thread object. In addition to explicit thread creation, if two instructions reachable from two top-level methods (i) access a shared object, and (ii) one of them reads and the other writes to the shared object, then a communication pair is identified.

With reference to the example HDFS program code of FIG. 6, the thread communication relationship determination 56 generates the following example tuple:

(writeBlock, PacketResponder.run, local, <DataXceiver.block.poolID, PacketResponder.block.poolID>, . . . )

indicating that the writeBlock( ) method can communicate with the PacketResponder class via local thread creation, and indicating that "poolID" is the request identifier used on both ends for the data value passed between the threads.

For threads that communicate via a network, the fact that sender and receive communicate on the same protocol is used instead of pairing socket reads and writes. This advantageously avoids unnecessarily connecting together top-level methods that do not communicate. Specifically, the thread communication relationship determination 56 pairs top-level methods containing pairs of invoke instructions whose target methods are the serialization and deserialization methods from the same class, respectively. It is contemplated that developers often use third-party data-serialization libraries, such as Google Protocol Buffers. The thread communication relationship determination 56 can thus be configured to recognize standardized serialization/deserialization Application Programming Interfaces (APIs). The thread communication relationship determination 56 is also configured to parse the Google Protocol Buffer's protocol annotation file to identify the RPC pairs, where each RPC is explicitly declared. Regarding addressing Cassandra, another data-serialization library, an annotation to pair C.serialize( ) with C.deserialize( ) for any class C is sufficient to correctly pair communicating top-level methods.

The thread communication relationship determination 56 can be further configured with two additional techniques to improve accuracy of log stitching. First, a thread will be included in a communication pair, even when the thread does not contain any log point (which means it does not contain any top-level method), as long as the thread communicates with a top-level method. In Java implementations, such a thread's run( ) method is used as the communication end point. This is advantageous because grouping log messages can be performed for such a thread, which may serve as a link connecting two communicating top-level methods, despite the thread not contain any log points.

Second, the number of times a top-level method can occur in a communication pair can be determined. For example, a communication pair "(M1, M2*, local, . . . )", where M2 is followed by an asterisk, means that method M1 can communicate with multiple instances of method M2 in the same request. Log analysis performed by the log processing engine 34 can use this property to further determine whether messages from multiple instances of method M2 can be stitched into the same request. This is because, if the communication point to method M2 is within a loop in method M1's CFG, then method M2 can be executed multiple times.

The program code analysis process 48 of FIG. 3, including log-statement parsing 50, request identifier determination 52, temporal order determination 54, and thread communication relationship determination 56, specifically configures a computer to analyze program code 40 to generate a log model capable of being used to stitch together future log messages output due to the processing of a single request by the program code 40.

For example, considering the example HDFS program code in FIG. 6, write requests are processed on each data node (e.g., a computer of the distributed system 22) by a "DataXceiver" thread that uses a while loop to process each incoming request. A "WRITE_BLOCK" op-code invokes the writeBlock( ) method (at line 7), which sends a replication request to the next downstream data node (line 15). A new thread associated with the PacketResponder( ) method is created (line 16-17) to receive the response from the downstream data node, so that a response can be sent upstream. Execution of this program code can result in log messages as shown in FIG. 4. These six example log messages illustrate two advantages of the present invention. First, log messages produced when processing a single request to the writeBlock( ) method may come from multiple threads, and multiple requests may be processed concurrently. The program code analysis process 48 of FIG. 3 is configured to construct a log model that can be used to organize intertwined log messages resulting from different requests. Second, the log model is configured to account for log messages that do not contain an identifying substring that is unique to a request, which are contemplated to be most log messages encountered. For example, while block identifier "BP-9 . . . 9:blk_5 . . . 7" in FIG. 4 can be used to distinguish log messages from different requests that do not operate on the same block, it cannot be used to distinguish log messages of the read request ("read") and the first write request ("write 1") because they operate on the same block. The present invention distinguishes log messages using more than merely log message string text.

The log model 42 generated by the program code analysis process 48 of FIG. 3 includes a file, or other data structure, that encodes the log message outputting behavior of the program code as executable on the distributed computer system 22. FIG. 9 schematically illustrates a snippet of a log model file 70 for the example of HDFS. The log model file 70 includes four segments 72-78. A top-level method segment 72 is generated by the request identifier determination 52 and lists tuples identifying a name of the top-level method 80, an index into the DAG representation of the log points 82, and a list of request identifiers 84. A DAG segment 74 is generated by the temporal order determination 54 and describes the DAG for each top-level method. The format of the DAG description is shown schematically for illustrative purposes, and any format can be used. A logpoint regular expression segment 76 is generated by the log-statement parsing 50 and contains a regular expression for each log point and an identifier for each wildcard in the regular expression. A communication pair segment 78 is generated by the thread communication relationship determination 56 and lists tuples that identify the communication points along with the identifiers for the data being communicated.

The program code analysis process 48 can be configured to generate one or more indexes and to include the indexes in the log model file 70, so as to increase the speed of log analysis performed by the log processing engine 34. Examples of such indexes include an index of regular expressions (to speed the matching of each log message to its log point) and an index mapping log points to top-level methods.

The log model file 70 is transmitted to each computer whose log is to be analyzed in the distributed computer system 22.

Figure 10:
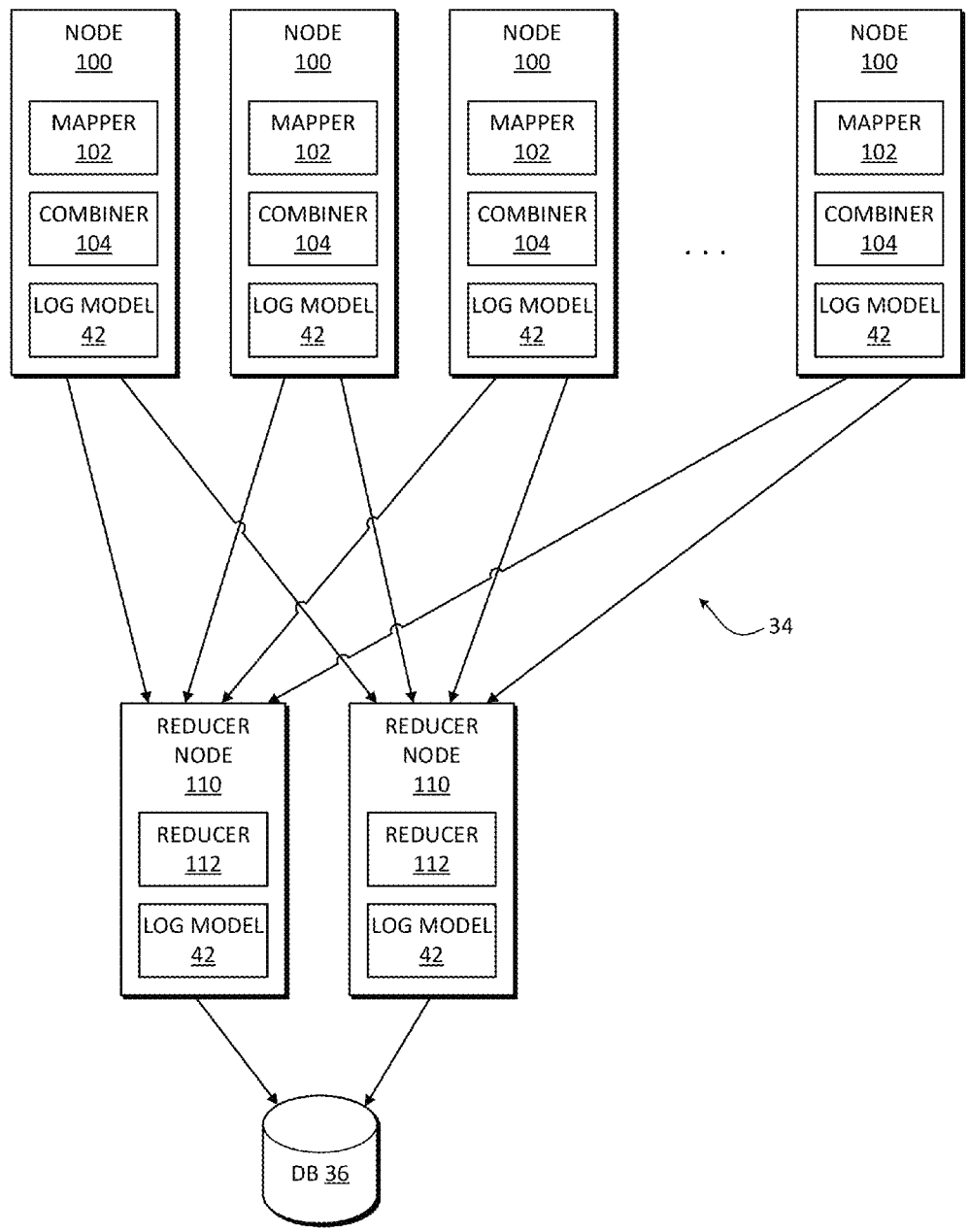
FIG. 10 is a diagram of the log processing engine.

FIG. 10 shows a diagram of the log processing engine 34 and the results database 36.

The log processing engine 34 includes mappers 102 and combiners 104 executed at various nodes (computers) 100 of the distributed computer system 22. Each node 100 stores a copy of the log model 42, or otherwise has access to the log model 42, generated as discussed above. The log processing engine 34 further includes reducer nodes (computers) 110 configured to execute reducers 112. Output of the reducer nodes 110 is transmitted to and stored at the results database 36. Each reducer node 110 stores a copy of the log model 42, or otherwise has access to the log model 42, generated as discussed above. The mappers 102, combiners 104, and reducers 112 include program code configured to perform the processes discussed below when executed by the respective nodes 100 and reducer nodes 102. The log processing engine 34 accordingly implements a MapReduce job, although this is not limiting and other implementations for the log processing engine 34 are within the scope of the present invention.

The mappers 102 and reducers 112 use a common data structure, termed a request accumulator (RA), for gathering information related to the same service request. Each RA entry contains: (i) a vector of top-level methods that are grouped into this RA; (ii) the value of each request identifier; (iii) a vector of log point sequences, where each sequence comes from one top-level method; and (iv) a list of nodes traversed, with the earliest and latest timestamp. The mappers 102 and reducers 112 are configured to iteratively accumulate the information of log messages from the same service request into such RA entries. Output generated by the mappers 102 and reducers 112 has the form of one RA entry per service request, where the one RA entry contains the information summarized from all log messages determined to be related to that service request.

Each mapper 102 implements a map process that is executed on a node 100 to process local log files generated by or otherwise stored on that node 100. Each node 100 has one mapper 102, and the mappers 102 execute their map processes in parallel. Each mapper 102 is configured to scan the relevant log file linearly and parse each log message in the log file to identify any log points and request identifiers. Identifying log points and request identifiers can include using regular expression matching. In addition, each mapper 102 can be configured to heuristically process timestamps associated with log messages.

Figure 11:
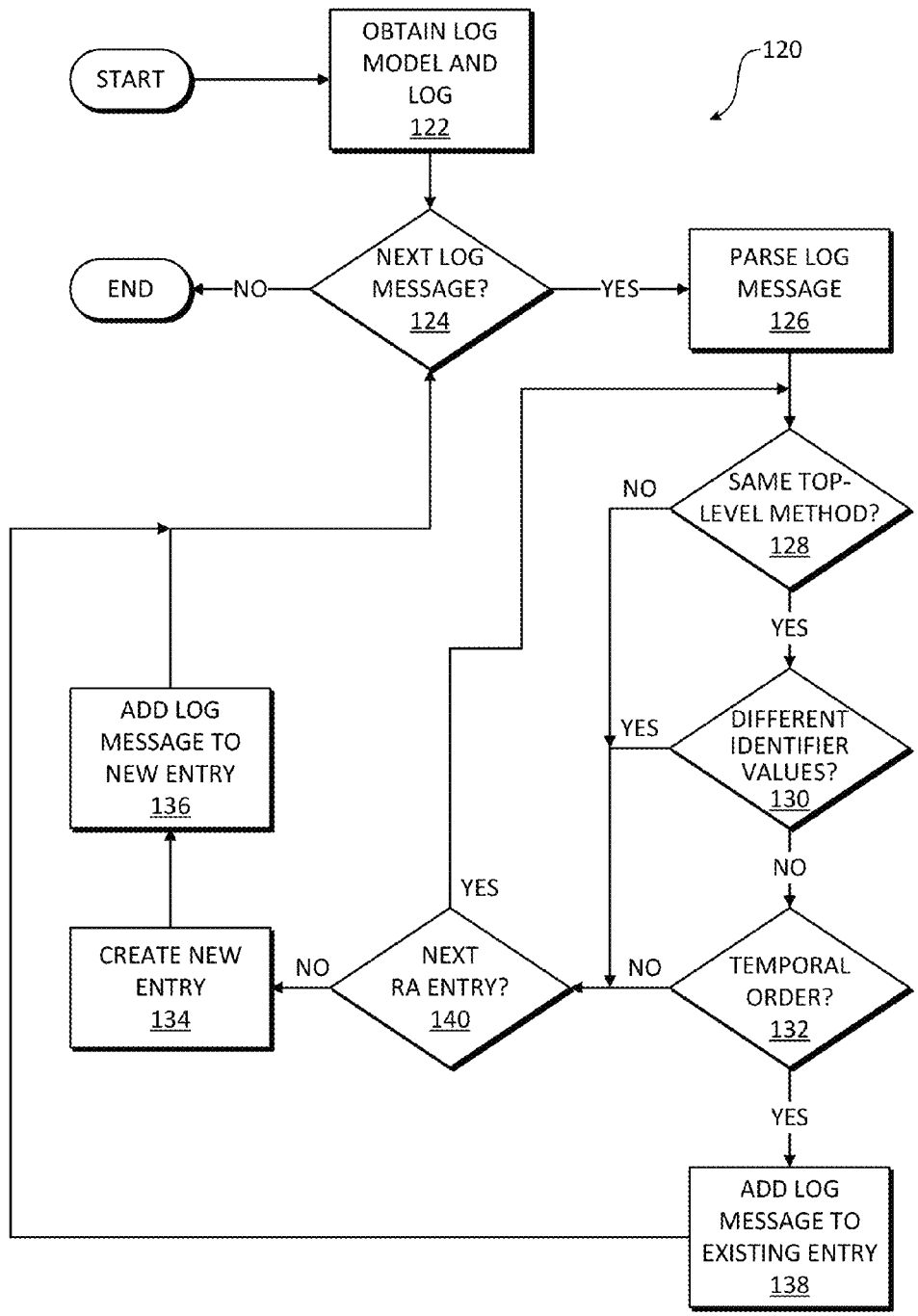
FIG. 11 is a flowchart of a log message grouping process.

In this embodiment, each mapper 102 is configured to add a parsed log message to an existing RA entry according to a log message grouping process 120 shown in FIG. 11.

At step 122, the log model 42 and log to be processed are obtained. The process 120 then iterates through all log messages in the log, via step 124. The current log message is parsed, at step 126, and then checked against conditions in steps 128-132 obtained from the log model 42. The conditions in steps 128-132 evaluate the information in the log message against information for each RA entry. Steps 128-132 are performed to compare the current log entry to all existing RA entries, via step 140, until all conditions are met. Steps 128-132 can be performed in any order.

At step 128, it is determined whether the top-level methods of the parsed log message and the existing RA entry match. When no match is found in any of the RA entries, a new RA entry is created and initialized, at step 134. Initialization of an RA entry includes associating the relevant information of the log message that triggered the creation of the RA entry with the RA entry. The current log message is then assigned to the new RA entry at step 136 and the process repeats for the next log message, if any.

At step 130, it is determined whether request identifier values of the parsed log message and the existing RA entry under consideration do not conflict. That is, if the request identifier values are different to those in the RA entry under consideration, then this is determined to be a conflict and the process considers the next RA entry, if any. If it turns out that the request identifier values are different to those in all RA entries, then the process creates a new RA entry and assigns the current log message to the new RA entry, at steps 134 and 136.

At step 132, it is determined whether the log point of the parsed log message matches the temporal sequence in the control flow as represented by the DAG of the RA entry. If no such match is determined for any or the RA entries, then the process creates a new RA entry and assigns the current log message to that entry, at steps 134 and 136.

If the conditions of steps 128-132 are met, then the current log message is added to the RA entry under consideration, at step 138.

In other words, a log message is added to an existing RA entry if and only if: (i) the top-level methods of the parsed log message and the existing RA entry match, (ii) the identifier values of the parsed log message and the existing RA entry do not conflict, and (iii) the log point of the parsed log message matches the temporal sequence in the control flow as represented by the DAG of the RA entry.

As a result, each RA entry outputted by the mappers 102 contains exactly one top-level method. In other embodiments, the above requirements can be relaxed as long as any resulting potential ambiguity in the resulting data can be tolerated.

Figure 12:
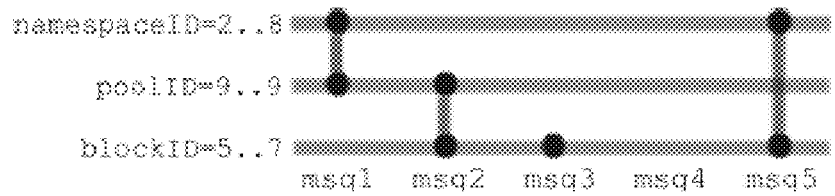
FIG. 12 is a diagram of example log messages added to the same group.

In view of that above, it is noted that a sequence of log messages can advantageously be added to the same RA entry even when each log message contains the values of a different subset of request identifiers. FIG. 12 shows an example of such. The five log messages in this figure can all be grouped into a same RA entry even though four of the log messages contain the values of a subset of the request identifiers, and one of the log messages does not contain the value of any request identifier and instead is captured using the DAG.

With reference back to FIG. 10, each combiner 104 is configured to compare pairs of RA entries with reference to the log model 42 and to combine a pair of RA entries into one RA entry if there exists a communication pair between the two top-level methods in the pair of RA entries and if the request identifier values do not conflict. In addition, the combiner 104 is configured to not combine RA entries if the difference between their timestamps is larger than a configurable threshold. This is advantageous because two RA entries may have the same top-level methods and request identifies, but may represent the processing of different service requests (e.g., two writeBlock operations on the same block). An example threshold value is one minute, although various values can be selected based on the specific networking environment. For instance, in an unstable network environment with frequent congestion, it may be advantageous to set this threshold to a longer value.

Each combiner 104 is configured to then assign a shuffle key to each RA entry and transmit each RA entry to a particular reducer node 110 based on the assigned shuffle key. The same shuffle key is assigned to all RA entries that are to be grouped together. The combiners 104 are configured to assign shuffle keys based on communication pairs to achieve this grouping. Specifically, communication pairs, as indicated in the log model 42 are referenced, so that if there is a communication pair connecting two top-level methods A and B, then the methods A and B are joined together into a connected component (CC). The combiners 104 iteratively merge additional top-level methods into a CC as long as such methods communicate with any of the top-level methods assigned to this CC. As a result, all of the top-level methods in a CC are those that can mutually communicate, and their RA entries are assigned the same shuffle key. The combiners 104 do not transmit raw log messages over the network, at this time, although this does not exclude sending raw log messages at a later time. Rather, the combiners locally group log messages and assign shuffle keys, which can improve the efficiency (e.g., network bandwidth) of the generation and collection of log information.

This shuffling process performed by the combiners 104 can further include two additional steps, so as to mitigate potential assignment of a small number of shuffle keys and thus a poor distribution. First, if all of the communicating top-level methods are determined to have common request identifiers, the combiners 104 are configured to use the identifier values to further differentiate shuffle keys. Second, if it is determined that an RA entry cannot possibly communicate with any other RA entry through network communication, the RA entry is directly output into the results database 36.

Each reducer 112 is configured in the same way as a combiner 104 and performs the same processes that the combiner 104 first performs at a local level.

Figure 13:
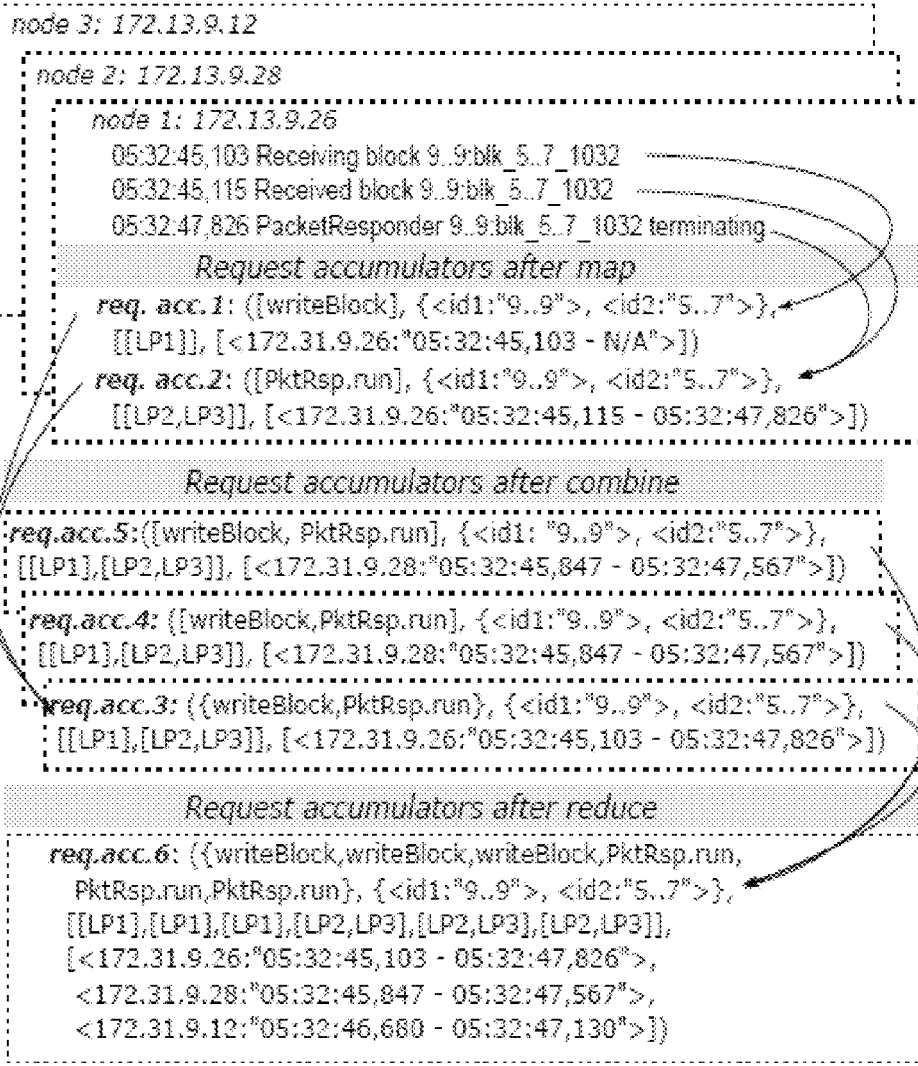
FIG. 13 is a diagram showing example combining and reducing of log messages in an HDFS system.

FIG. 13 shows an example of how the RA entries of log messages in an HDFS writeBlock request are grouped together. In this example, RA entries combine nine log messages from six threads on three nodes belonging to a single HDFS write request. As shown, after the mappers 102 generate RA entries "req.acc.1" and req.acc.2 on node "1", the combiners 104 group these RA entries into an RA entry "req.acc.3" because the log model 42 indicates that the writeBlock( ) and PacketResponder.run( ) methods belong to the same communication pair and that their request identifier values match. Node "2" and node "3" execute the mappers 102 and combiners 104 in parallel to generate RA entries "req.acc.4" and "req.acc.5". The same shuffle keys are assigned to RA entries "req.acc.3", "req.acc.4", and "req.acc.5". The reducers 112 further group RA entries "req.acc.3", "req.acc.4", and "req.acc.5" into a final RA entry "req.acc.6".

Figures 14, 15:
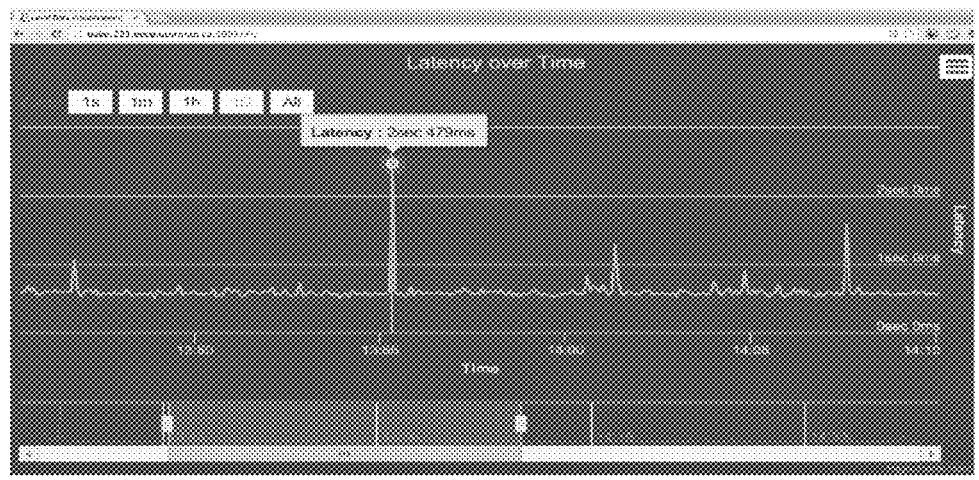
FIG. 14 is a diagram of a schema for the results database to store information of log messages in association with service requests.
FIG. 15 is a chart of an example latency-over-time visualization.

FIG. 14 is a diagram of a schema for the results database 36. Information from each RA entry generated by the log processing engine 34 is stored the results database 36 according to this schema.

The database schema contains the following fields: (i) request type, which identifies the top-level method with the earliest time stamp; (ii) starting and ending time stamps, which are the MAX and MIN in all the timestamps of each node; (iii) nodes traversed and the time stamps on each node, which are taken directly from the RA entry; and (iv) log sequence ID (LID), which is a hash value of the log sequence vector field in the RA entry. In the example shown in FIG. 14, the vector of the log sequence of a writeBlock request is:

"[[LP1],[LP1],[LP1],[LP2,LP3],[LP2,LP3],[LP2, LP3]]".

In this vector, each element is a log sequence from a top-level method (e.g., "[LP1]" is from top-level method writeBlock( ) and "[LP2,LP3]" is from the PacketResponder.run( ) method). Note that the LID captures the unique type and number of log messages, their order within a thread, as well as the number of threads.

With reference back to FIG. 1, the visualization engine 38 can be configured to use the results database 36 to output information related to the performance and behaviour of the distributed computer system 22. For example, the visualization engine 38 can be configured to query the results database 36 to generate output for graphical display of latency trends over time for each type of service request, for graphical display of average, high, and low latencies per node, and for mining of log data for anomalies.

The visualization engine 38 can be implemented as a web application that is accessible to admin terminals associated with the distributed computer system 22. A JavaScript charting library, such as Highcharts, can be used. The web application can be configured to output request latency over time; request count and count trend over time, and average latency per node. FIG. 15 shows an example latency-over-time visualization.

Tests were conducted on a log processing system 30 as described above. The tests are discussed below and should not be taken as limiting.

The system 30 was evaluated on four, off-the-shelf distributed systems: HDFS, Yarn, Cassandra, and HBase. Workloads were run on each system on a 200 EC2 node cluster for over 24 hours with the default logging verbosity level. Default verbosity is used to evaluate the system 30 in settings closest to the real-world. HDFS, Cassandra, and YARN used INFO as the default verbosity, and HBase used DEBUG. A timestamp was attached to each message using the default configuration in all of these systems.

For HDFS and Yarn, HiBench was used to run a variety of MapReduce jobs, including both real-world applications (e.g., indexing, pagerank, classification and clustering) and synthetic applications (e.g., wordcount, sort, terasort). Together they processed 2.7 TB of data. For Cassandra and HBase, the YCSB benchmark was used. In total, the four systems produced over 82 million log messages. The results are summarized in FIG. 16.

FIG. 17 shows the results of static analysis tests performed by the system 30. In the columns indicated with an asterisk, only the log points that were under the default verbosity level and not printed in exception handler, indicating they are printed by default under normal conditions, were counted. On average, 81% of the statically inferred threads contain at least one log point that would print under normal conditions, and there were an average of 20 such log points reachable from the top-level methods inferred from the threads that contain at least one log point. This suggests that logging is prevalent. In addition, 66% of the log points contain at least one request identifier, which can be used to separate log messages from different requests. This also suggests that the log processing system 30 has to rely on the generated DAG to group the remaining 34% log points. The static analysis test took less than 2 minutes to run and 868 MB of memory for each system. Each of the log sequence IDs (LID) generated by the system 30 were manually verified. It is noteworthy that only 784 different LIDs were extracted out of a total of 62 million request instances.

FIG. 18 shows the request attribution accuracy of the log processing system 30 as tested. A log sequence A was considered correct if and only if (i) all its log points indeed belong to this request, and (ii) there is no other log sequence B that should have been merged with the log sequence A. All of the log messages belonging to a correct log sequence were classified as "correct". If log sequences A and B should have been merged but were not then the messages in both sequence A and B were classified as "incomplete". If a log message in sequence A does not belong to sequence A then all the messages in sequence A were classified as "incorrect". The "failed" column counts the log messages that were not attributed to any request.

FIG. 19 shows a chart of a cumulative distribution function on the number of log messages per unique request, i.e., the one with the same log sequence ID. In each system, over 44% of the request types, when being processed, print more than one message. Most of the requests printing only one message are system's internal maintenance operations. For Cassandra, the number of nodes each streaming session traverses varies greatly, resulting in a large number of unique log sequences (it eventually reaches 100% with 1484 log messages, which is not shown in the figure).

In further tests, 23 user-reported real-world performance anomalies were randomly selected from Bugzilla databases associated with the systems tested. Bugs were reproduced each one to obtain logs, and the effectiveness of the log processing system 30 was tested, with results summarized in FIG. 20.

Figures 21, 22, 23:
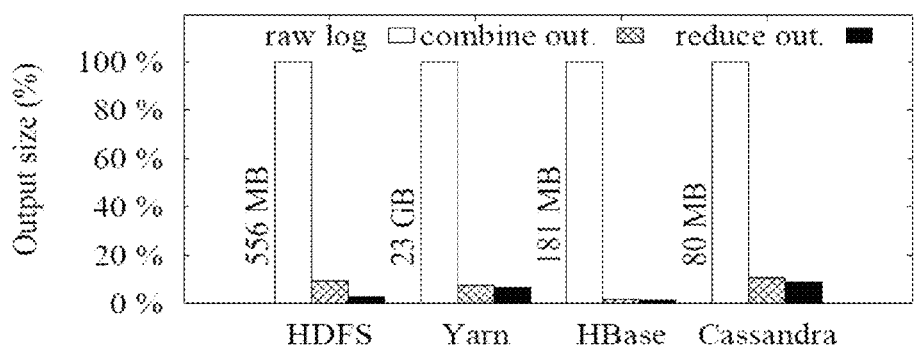

FIG. 21 shows features of the system that were found helpful in debugging real-world performance anomalies tested.

The mapping and combining processes discussed above ran on each EC2 node, and the reduce process ran on a single server with 24 2.2 GHz Intel Xeon cores and 32 GB of RAM. FIG. 22 shows the size of intermediate result. On average, after the mapping and combining processes, the intermediate result size is only 7.3% of the size of the raw log. This is the size of data that has to be shuffled over the network for the reduce function. After the reducing process, the final output size is 4.8% of the size of the raw log. FIG. 23 shows the time and memory used by the system 30 under test. The mapping and combining processes finished in less than six minutes for every system exception for Yarn, which took 14 minutes. Over 80% of the time is spent on log parsing. When a message can match multiple regular expressions, it was observed to take much more time than those that match uniquely. The memory footprint for map and combine is less than 3.3 GB in all cases. The reducing process took no more than 21 seconds for HDFS, Cassandra, and HBase, but took 19 minutes for Yarn. However, the tested reducing process was not parallelized, as it would be in real-world usage.

Advantages of the present invention have been discussed above. For example, the invention is non-intrusive, in that no modification is required to any part of the existing production software stack of a distributed computer system under analysis. This makes the invention suitable for profiling production systems. The invention is also capable of in-situ and scalable analysis, in that much of the processing is performed on the same node (computer) where the logs are stored. Further, only one linear scan of each log file is needed. This can avoid sending the logs over a network to a centralized location to perform analysis, which may be unrealistic in real-world clusters. In addition, the present invention provides a compact representation allowing historical analysis. Extracted log information is stored in relation to each request in a compact form, so that it can be retained for a longer time. This allows historical analysis where current performance behavior can be compared to the behavior at a previous point of time, which may be useful to detect slowdown creep. The invention is also loss-tolerant, insofar as original log data can be lost after it has been processed. Further, if the logs of a few nodes are not available, their input can simply be discarded without affecting the analysis of requests not involving those nodes.

While the foregoing provides certain non-limiting example embodiments, it should be understood that combinations, subsets, and variations of the foregoing are contemplated. The monopoly sought is defined by the claims.

What is claimed is:

1. A process for performing computer log analysis, the process comprising:
   performing an analysis on existing program code that is executable on one or more computers forming part of a distributed computer system, the analysis identifying log output instructions present in the program code, the log output instructions being configured to generate log messages related to service requests processed by the program code;
   generating a log model using the analysis, the log model being representative of causal relationships among service requests defined by the program code;
   applying the log model to a plurality of log messages generated by execution of the program code to add log messages of the plurality of log messages into one or more groups; and
   applying of the log model at a plurality of nodes of the distributed computer system, the plurality of nodes being connected by a network, at least two nodes of the plurality of nodes combining groups of log messages locally without transmitting the log messages over the network before assigning shuffle keys to the groups of log messages and transmitting the groups of log messages over the network to one or more nodes of the plurality of nodes based on the assigned shuffle keys, the one or more nodes further combining received groups of log messages.

2. The process of claim 1, wherein generating the log model comprises identifying a log output statement in the program code and parsing the log output statement to determine a format of the log output statement and any variable referenced by the log output statement to generate a signature of the log output statement.

3. The process of claim 2, further comprising using a value of a variable referenced by the log output statement to generate the signature for the log output statement.

4. The process of claim 3, storing in the signature of the log output statement as a regular expression.

5. The process of claim 1, wherein generating the log model comprises analyzing dataflow of variables of the program code and storing in the log model one or more indications of one or more variables not modified by a particular service as a request identifier of the particular service request.

6. The process of claim 5, wherein generating the log model comprises identifying a top-level method in the program code as a first method of any thread dedicated to the processing of a single type of service request and storing an identifier of the top-level method in the log model.

7. The process of claim 6, further comprising determining that the particular service request is processed by the top-level method and storing in the log model the request identifier of the particular service request in association with the identifier of the top-level method.

8. The process of claim 1, wherein generating the log model comprises identifying log output statements in the program code and generating indications of temporal associations or dissociations among the log output statements.

9. The process of claim 1, wherein generating the log model comprises identifying log output statements in the program code, identifying threads that contain the log output statements, determining which pairs of the threads communicate with each other, and storing an indication of any determined communicating pairs of threads in the log model.

10. The process of claim 9, wherein determining which pairs of the threads communicate with each other comprises detecting thread creation.

11. The process of claim 9, wherein determining which pairs of the threads communicate with each other comprises determining whether two instructions reachable from two top-level methods operate on a shared object, wherein each of the two top-level methods is a first method of any thread dedicated to the processing of a single type of service request.

12. The process of claim 11, wherein applying the log model comprises adding a particular log message to a particular group on a condition that the particular log message shares a common top-level method with the group.

13. The process of claim 12, wherein the adding is further based on a condition that one or more request identifiers of the particular log message are not different from one or more request identifiers of the group.

14. The process of claim 13, wherein the one or more request identifiers of the particular log message and the one or more request identifiers of the group are indicative of variables in the program code that are not modified during processing of a service request.

15. The process of claim 12, wherein the adding is further based on a condition that a log point of the particular log message matches a temporal sequence in a control flow of the program code.

16. The process of claim 12, further comprising storing the log model at a logging computer of the distributed computer system, the logging computer performing the applying of the log model.

* * * * *